(12) United States Patent
Hatanaka et al.

(10) Patent No.: US 9,162,698 B2
(45) Date of Patent: Oct. 20, 2015

(54) VEHICULAR INPUT APPARATUS

(71) Applicant: DENSO CORPORATION, Kariya, Aichi-pref. (JP)

(72) Inventors: Shinji Hatanaka, Okazaki (JP); Tomohiro Miyachi, Kariya (JP)

(73) Assignee: DENSO CORPORATION, Kariya, Aichi-Pref (JP)

( * ) Notice: Subject to any disclaimer, the term of this patent is extended or adjusted under 35 U.S.C. 154(b) by 428 days.

(21) Appl. No.: 13/770,298

(22) Filed: Feb. 19, 2013

(65) Prior Publication Data

US 2013/0213179 A1 Aug. 22, 2013

(30) Foreign Application Priority Data

Feb. 22, 2012 (JP) ................... 2012-036543

(51) Int. Cl.
    B62D 1/04 (2006.01)
    G05G 9/047 (2006.01)

(52) U.S. Cl.
    CPC ........ *B62D 1/04* (2013.01); *B62D 1/046* (2013.01); *G05G 9/047* (2013.01); *G05G 2009/04762* (2013.01); *Y10T 74/20834* (2015.01)

(58) Field of Classification Search
    CPC ...... Y10T 4/20834; B62D 1/04; B62D 1/046; G05G 9/047; G05G 2009/04762
    See application file for complete search history.

(56) References Cited

U.S. PATENT DOCUMENTS

| | | | |
|---|---|---|---|
| 5,335,743 A * | 8/1994 | Gillbrand et al. | 180/178 |
| 6,634,454 B2 * | 10/2003 | Sugitani et al. | 180/402 |
| 7,158,112 B2 * | 1/2007 | Rosenberg et al. | 345/156 |
| 7,204,338 B2 * | 4/2007 | Katae et al. | 180/315 |
| 7,381,912 B2 * | 6/2008 | Hyun et al. | 200/4 |
| 7,409,879 B2 * | 8/2008 | Glatz | 73/862.541 |
| 7,703,570 B2 * | 4/2010 | Ringger et al. | 180/336 |
| 8,996,261 B2 * | 3/2015 | Sata | 701/51 |
| 9,002,597 B2 * | 4/2015 | Sata | 701/52 |
| 9,016,168 B2 * | 4/2015 | Prokhorov | 74/552 |
| 2012/0055268 A1 | 3/2012 | Hatanaka et al. | |

FOREIGN PATENT DOCUMENTS

| | | |
|---|---|---|
| JP | 63-310017 | 12/1988 |
| JP | 10-108851 | 4/1998 |
| JP | B2-2760472 | 5/1998 |
| JP | B2-2760473 | 5/1998 |

(Continued)

OTHER PUBLICATIONS

Office Action dated Jun. 23, 2015 in corresponding Japanese Application No. 2012-036543.

*Primary Examiner* — David M Fenstermacher (74) *Attorney, Agent, or Firm* — Harness, Dickey & Pierce, P.L.C.

(57) ABSTRACT

An input apparatus disposed on a core unit of a steering wheel has an operable body. The operable body has multiple straining bodies that have a transfer surface part. The transfer surface part has a displacement transfer surface formed thereon, and the displacement transfer surface has a detector for detecting a displacement of the displacement transfer surface according to an operation force applied to an operation surface. The straining bodies and the operable body are arranged such that a portion of the operable body extends towards a rim of the steering wheel from, or across, a line connecting two straining bodies that are positioned closer to the rim than other straining bodies.

11 Claims, 8 Drawing Sheets

(56) References Cited

FOREIGN PATENT DOCUMENTS

| JP | 2006-252093 | 9/2006 |
| JP | 2009-298285 | 12/2009 |
| JP | 2011-218968 | 11/2011 |
| JP | 2012-058967 | 3/2012 |

* cited by examiner

| ELEMENT | RESISTANCE VALUE CHANGE |
|---------|-------------------------|
| 30a | DECREASE |
| 30b | DECREASE |
| 30c | INCREASE |
| 30d | INCREASE |

VEHICULAR INPUT APPARATUS

CROSS-REFERENCE TO RELATED APPLICATION

This application is based on and claims the benefit of priority of Japanese Patent Application No. 2012-36543 filed on Feb. 22, 2012, the disclosure of which is incorporated herein by reference.

TECHNICAL FIELD

The present disclosure generally relates to a vehicular input apparatus that inputs operation information for operating an in-vehicle device installed in a vehicle.

BACKGROUND

A technique for installing a vehicular input apparatus that can input operation information for operating in-vehicle devices at a position on a steering wheel of a vehicle is disclosed in Japanese Patent Laid-Open No. 2009-298285.

The inventor of the present disclosure has already filed an application JP-2010-200887 regarding an input apparatus that includes a straining body and a strain detector. The straining body has a displacement transfer surface for transferring an operation force to a periphery of an operation surface that locates a position of the operation force on the operation surface. The strain detector detects a displacement of the displacement transfer surface. The input apparatus disclosed by the inventor in a prior filing may be installed on a steering wheel.

According to the inventor's study regarding how close the input apparatus may be positioned to a rim (i.e., a gripping portion) of the steering wheel, the straining body that is positioned on or around the periphery of the operation surface may interfere with the installation of the input apparatus on the steering wheel. When the installation position of the operation surface is not sufficiently close to the rim of the steering wheel due to such interference, it may be difficult for a driver of the vehicle to operate the operation surface when the driver is gripping the rim of the steering wheel with their hands (i.e., a gripping state).

SUMMARY

In an aspect of the present disclosure, a vehicular input apparatus is disposed on a steering apparatus of a vehicle, and inputs operation information for operating an in-vehicle device installed in the vehicle. The steering apparatus has a core unit, which is fixed on a steering shaft and rotates with the steering shaft, and a rim unit, which is disposed on a periphery of the core unit and gripped by a user. The vehicular input apparatus includes a housing disposed on the core unit and an operable body disposed on the housing. The operable body has an operation surface.

The vehicular input apparatus also includes at least three straining bodies, a strain gauge, and an output unit. The straining bodies are arranged on the housing, such that two of the straining bodies positioned closest to the rim unit are designated as closest-to-rim straining bodies. Each straining body has a joint part, a fixation part, and a transfer surface part. The joint part is coupled to a periphery of the operable body, the fixation part is affixed to the housing, and the transfer surface part is between the joint part and the fixation part. The transfer surface part further has a displacement transfer surface formed thereon for displacing the straining body according to a pressure caused by an operation force from the user.

The strain gauge is disposed on the displacement transfer surface of the straining body and detects a strain of the displacement transfer surface caused by the displacement of the straining body. Based on a detection result of each of the strain gauges, the output unit calculates the operation force and an operation position of the operation force on the operation surface, and outputs the operation position and the operation force calculated as the operation information to the in-vehicle device.

The operable body and the straining bodies are arranged such that the operable body is positioned to have a rim end portion of the operable body extend beyond the closest-to-rim straining bodies towards the rim unit. In particular, the rim end portion of the operable body crosses an end point line defined between end points of the closest-to-rim straining bodies.

According to the present disclosure, in a plan view, a rim-side end of the operable body sticks out, or extends, from an end line spanning between respective ends of two straining bodies that are positioned closest to the rim unit among other straining bodies. In such manner, the position of the straining bodies closest to the rim unit are farther from the rim unit than the position of the operable body is from the rim unit. Therefore, the operable body is able to be positioned as close as possible to the rim unit, thereby enabling a driver of the vehicle to input operation information into the apparatus in a steering wheel gripping state.

BRIEF DESCRIPTION OF THE DRAWINGS

Other objects, features and advantages of the present disclosure will become more apparent from the following detailed description disposed with reference to the accompanying drawings, in which.

DETAILED DESCRIPTION

Various embodiments of the present disclosure are now described with reference to the drawings. In the various embodiments, like parts have like numbers, and the description of like parts may not be repeated.

First Embodiment

An input apparatus 100 in the first embodiment of the present disclosure is described with reference to FIGS. 1 to 8.

Figure 1:
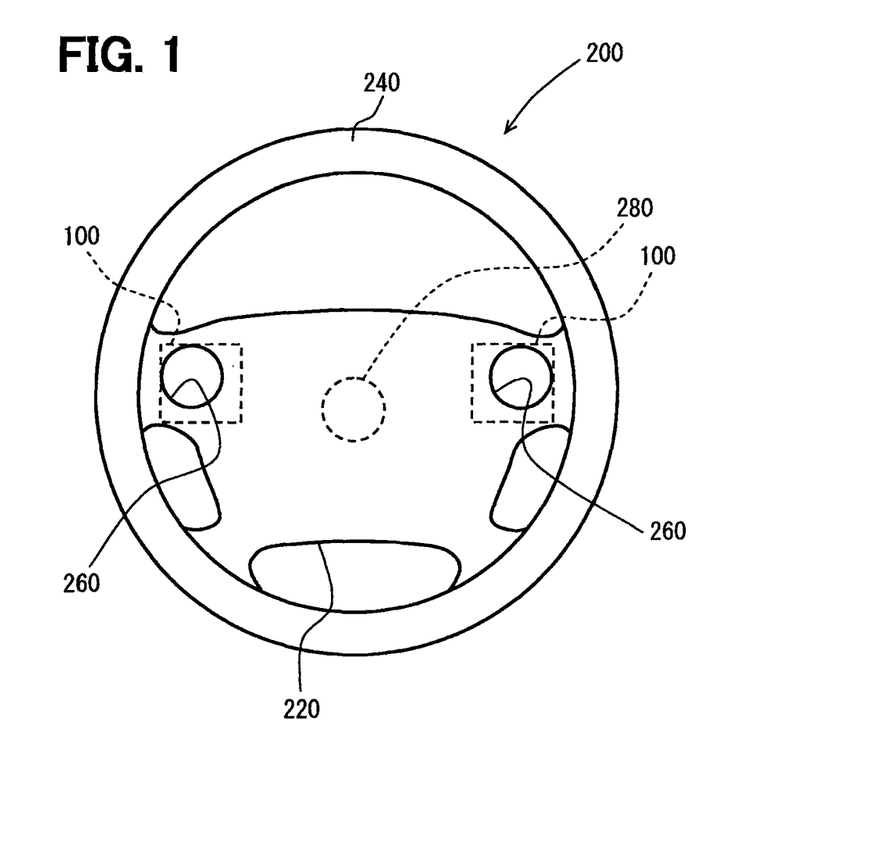
FIG. 1 is an illustration of a steering wheel having an input apparatus of the present disclosure.

A steering wheel 200 serving as a steering device of a vehicle is connected to a steering wheel shaft 280. A tire of the vehicle is steered by the rotation of the steering wheel 200 by a driver of the vehicle. The steering wheel 200 includes a core unit 220 that is fixed to the shaft 280 and rotates together with the shaft 280, and a rim unit 240 that is disposed at a periphery of the core unit 220 and is gripped by the driver. The core unit 220 has an input apparatus 100 installed thereon in proximity to the rim unit 240. The input apparatus receives an input of operation information that is used to operate an in-vehicle device, such as a navigation apparatus.

Figure 2:
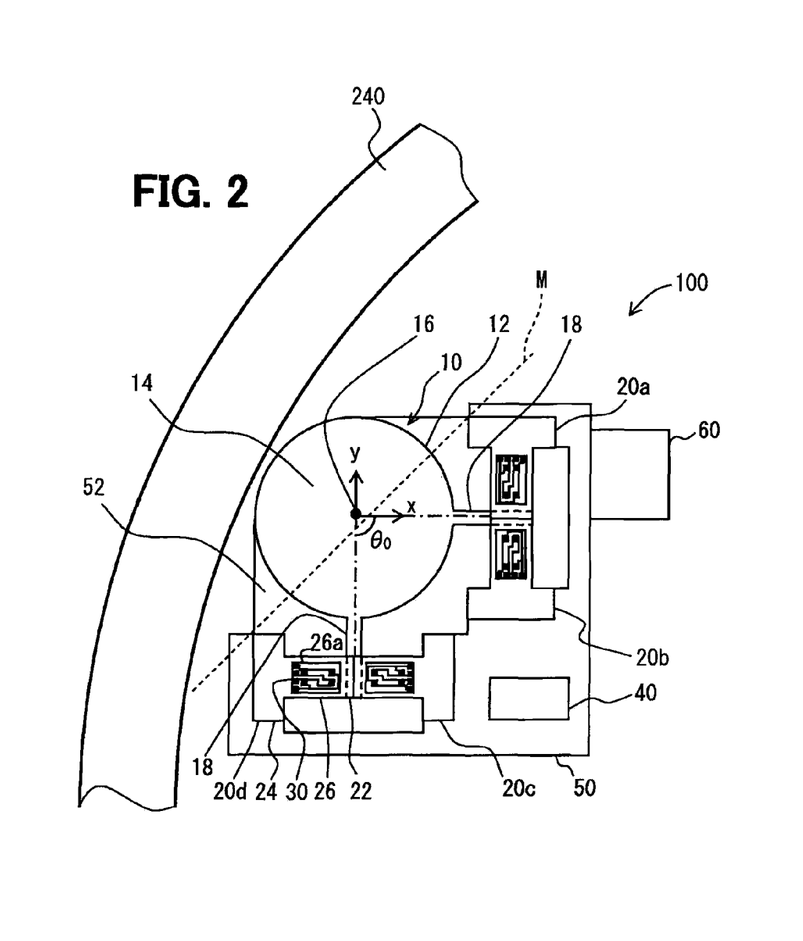
FIG. 2 is an illustration of the input apparatus in the first embodiment.
Figure 3:
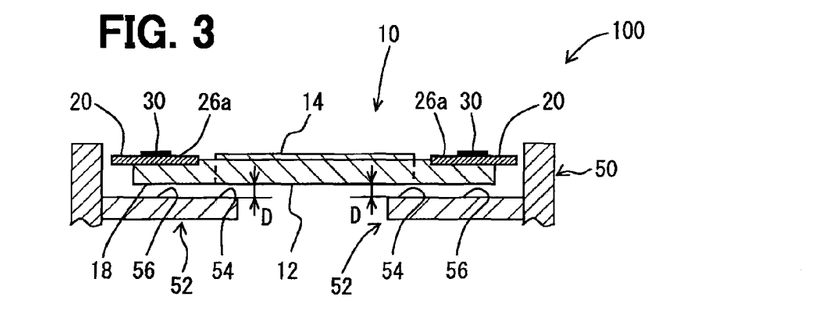
FIG. 3 is a cross-sectional view of the input apparatus in the first embodiment.

With reference to FIGS. 1-3, the input apparatus 100 includes a housing 50, an operable body 10, straining bodies 20a, 20b, 20c, and 20d, a detector 30, a signal processor 40, together with other parts. The straining bodies 20a, 20b, 20c, 20d may collectively and generally be referred to as a straining body 20.

The housing 50 is fixedly disposed to the core unit 220, and supports the operable body 10, the straining body 20, the detector 30, an actuator 60 and the signal processor 40.

The straining body 20 is connected to the operable body 10. Further, the straining body 20 and the housing 50 define a gap D interposed therebetween (FIG. 3). More practically, the straining body 20, except for a fixation part 24 thereof, and the operable body 10 are positioned above a bottom 52 of the housing 50 with the gap D. The gap D is a space reserved for a movement of the operable body 10 and the straining body 20, so that the operable body 10 is kept from contacting the bottom 52 when an operation force from the driver is applied onto an operation surface 14 of the operable body 10.

The bottom 52 has a first stopper 54 as a first displacement regulation unit at a position facing a back side of the operation surface 14 of the operable body 10, with a predetermined gap therebetween. Further, the bottom 52 has a second stopper 56 as a second displacement regulation unit at a position facing a back side of a transfer surface 26a of a transfer surface part 26, which is part of the straining body 20, with a predetermined gap therebetween. The detail of the operable body 10 and the straining body 20 are described later. Further, the housing 50 has the actuator 60 installed thereon, for the vibration of the housing 50 by the operation of the actuator 60.

The operable body 10 is operable by the driver of the vehicle. A part of the operable body 10 is exposed from an opening 260 that is formed on the core unit 220 for allowing the driver's finger to touch and operate the operable body 10. The operable body 10 includes a body part 12 in a disk shape, and two arms (protrusion parts) 18 that protrude from a periphery of the body part 1 in a radially-outward direction. The body part 12 and the arms 18 are formed to have one body. The operation surface 14 is provided on a surface of the body part 12 that faces the driver. The arm 18 may be referred to as an operation surface connection unit.

With reference to FIG. 3, one of the arms 18 is formed to have a position on an X axis and the other one of the arms 18 is formed to have a position on a Y axis in an X-Y coordinate system, which has its origin coinciding with a gravity center 16 of the operation surface 14. The arms 18 are formed on an opposite side of the rim unit 240 relative to the gravity center 16. Further, an angle defined by the arms 18 is about 90 degrees (FIG. 2). Specifically, the angle between two lines drawn from the gravity center 16 to the respective arms 18 and faces the steering wheel shaft 280 is about 90 degrees.

The straining body 20 is disposed in the housing 50, and is an elastically-deformable member that is elastically deformed by the operation force (i.e., pressure exerted) from the driver against the operation surface 14. The input apparatus 100 has four straining bodies 20. Each of the straining bodies 20 has a board shape, and includes a joint part 22, the fixation part 24, and the transfer surface part 26.

The joint part 22 is disposed on one end of the straining body 20, and is connected to a tip part of the arms 18. The fixation part 24 is disposed on the other end of the straining body 20 opposite to the joint part 22, and is fixed onto the housing 50.

The transfer surface part 26 is an elastically-deformable member in which an elastic deformation that curves the body of the transfer surface part 26 is caused according to a perpendicular force factor of the operation force on the operation surface 14. The transfer surface part 26 is disposed between the joint part 22 and the fixation part 24, and has the transfer surface 26a on its surface.

The transfer surface 26a is displaced under pressure by the operation force placed on the operation surface 14 by the driver. When the operation force is applied to the operation surface 14 in a condition that the fixation part 24 is fixed on the housing 50, the operable body 10 is tilted against the housing 50 by the operation force according to a position of the operation force applied to the operation surface 14. In other words, the operable body 10 is displaced or moved in a direction corresponding to the pressure exerted by the driver. Such a displacement of the operable body 10 is transferred to the joint part 22 via the arms 18. In such manner, the transfer surface part 26 is deformed in a curving manner, thereby displacing a position of the transfer surface 26a, with the fixation part 24 fixedly supported at its end on the housing 50. Therefore, the elastic deformation is caused on the transfer surface 26a in an inward direction, which compresses the surface 26a. That is, the transfer surface 26a may have a concave curve when elastically-deformed.

In the present embodiment, two straining bodies 20 are connected to a tip of one of two arms 18 (FIG. 2), and two remaining straining bodies 20 are connected to a tip of the other one of two arms 18. In particular, straining bodies 20a and 20b are disposed on the arm 18 along the X-axis and straining bodies 20c and 20d are disposed on the arm 18 along the Y-axis.

The join parts 22 of two straining bodies 20 positioned at the arm 18 abut with each other, with an axis of the straining bodies 20 aligned with each other. In other words, if the axis of the straining bodies 20a, 20b are defined to extend from the joint part 22 to the fixation part 24 through the transfer surface part 26, the axes of the straining bodies 20a, 20b run on one straight line. The straining bodies 20a, 20b are connected to the arm 18 along the axis and a protrusion direction of the arm 18. The axis the straining bodies 20a, 20b crosses the arm 18 at the protrusion direction of the arm 18, such that the axis of the straining bodies 20a and 20b may perpendicularly cross the protrusion direction of the arm 18. A similar configuration is also provided for straining bodies 20c, 20d and the arm 18 extending along the Y-axis.

The operation surface 14 and all transfer surfaces 26a are positioned substantially on the same plane (FIG. 3). Further when the straining bodies 20 are connected to the arms 18, a significant portion of the operation body 10 is positioned towards the rim unit 240. In particular, the straining bodies 20a, 20d are closer to the rim unit 240 than the straining bodies 20b, 20c. A broken line M connects an end point of the straining bodies 20a, 20d, and a portion of the operable body 10 extends towards the rim unit 240 (i.e., a closest-to-rim end of the operable body 10) from the broken line M.

With continuing reference to FIG. 2, two dashed lines extend from the gravity center 16 of the operation surface 14 respectively towards the joint parts 22 of the straining bodies 20a, 20b and the joint parts 22 of the straining bodies 20c, 20d. A binding angle $\theta_0$ is formed between the two dashed lines and opens towards the steering wheel shaft 280, and is less than 180 degrees. In FIG. 2 of the present embodiment, the binding angle $\theta_0$ between the two dashed lines is about 90 degrees.

In the present embodiment, the straining bodies 20 that are closest to the rim unit 240 are an upper right straining body 20 and a lower left straining body 20 (i.e., straining bodies 20a, 20d respectively). Furthermore, in the present embodiment, two other straining bodies 20 (i.e., straining bodies 20b, 20c) are disposed closer to the steering wheel shaft 280 and between the straining bodies 20 that are closer to the rim unit 240 (i.e., straining bodies 20a, 20d).

Figure 4A:
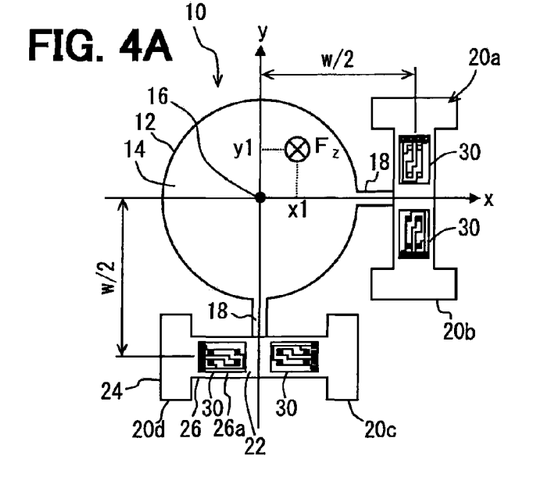
FIG. 4A is an illustration of an applied force on an operation surface of the input apparatus.
Figure 4B:
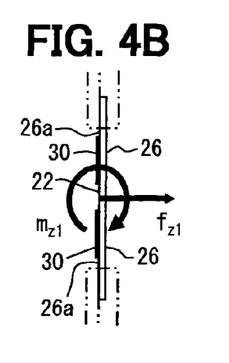
FIG. 4B is an illustration of a rotation moment about a X-axis of the applied force of FIG. 4A.
Figure 4C:
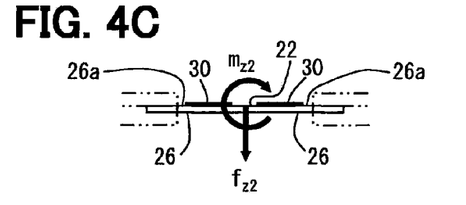
FIG. 4C is an illustration of a rotation moment about a Y-axis of the applied force of FIG. 4A.

With reference to FIG. 4, a force Fz perpendicular to the operation surface 14 (i.e., along a Z axis), is applied to the operation surface 14 at a position that has coordinates x1 and y1 in an X-Y coordinate system in which the origin is on the gravity center 16 of the operation surface 14. A clockwise rotation moment $m_{z1}$, if seen from the X axis, is generated on the arm 18 formed on the X axis, together with a force $f_{z1}$, which points perpendicularly to the back side of the operation surface 14 of the operable body 10. A counter-clockwise rotation moment $m_{z2}$, if seen from the Y axis, is generated on the arm 18 formed on the Y axis, together with a force $f_{z2}$, which points perpendicularly to the back side of the operation surface 14 of the operable body 10. The moments and the perpendicular forces that are perpendicular to the operation surface 14 are transmitted to the transfer surfaces 26a through the joint part 22, and the transfer surfaces 26a are displaced in an inward direction. The inward displacement of the transfer surface 26a causes a pulling reaction force or a compressive reaction force in the transfer surface 26a.

Each of the detectors 30 is disposed on the transfer surface 26a, detects a strain due to the pulling reaction force or the compressive reaction force as an amount of elastic deformation, and outputs, to the signal processor 40, a bridge voltage Vout according to the elastic deformation amount. The detector 30 may be referred to as a strain gauge in claims and the signal processor 40 may be referred to as an output unit.

Figure 5:
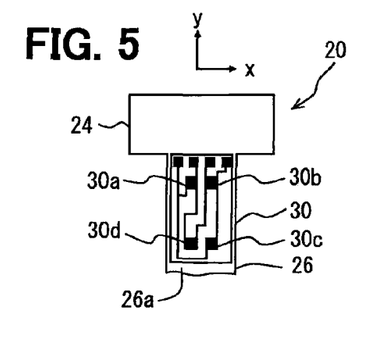
FIG. 5 is an illustration of a straining body of the input apparatus having detection elements.

With reference to FIG. 5, each of the detectors 30 has four elements 30a to 30d, among which elements 30a, 30b are disposed close to the fixation part 24, and elements 30c, 30d are disposed close to the joint part 22, and positions of the elements are chosen to correspond to pulling and compressive reaction force generation positions.

Figure 6:
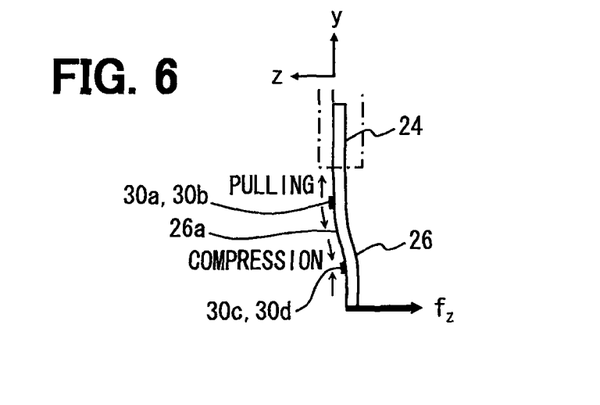
FIG. 6 is an illustration of displacement and strain of a transfer surface of the straining body.

For brevity, only the straining body 20 and the detector 30 depicted in upper right side of FIG. 2 (i.e., the straining body 20a and its associated detector 30), is shown in FIGS. 5 and 6.

Figure 8:
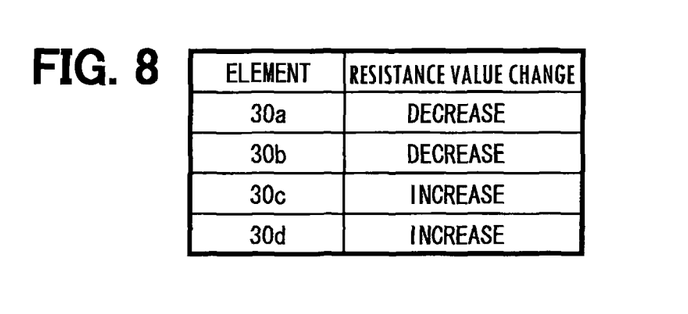
FIG. 8 is a table of changes of resistance values of each of the detection elements.

With reference to FIGS. 6 and 8, the resistance value of each of the four elements 30a to 30d changes according to the reaction force at the installation positions of the elements 30a to 30d that is caused by the force fz to the straining body 20. In other words, according to the amount of elastic deformation of the straining body 20. For example, when the pulling reaction force is generated and the transfer surface 26a is elastically deformed in an expanding manner, the resistance values of the elements 30a, 30b decreases, and, when the compressive reaction force is generated and the transfer surface 26a is elastically deformed in a contracting manner, the resistance values of the elements 30c, 30d increases.

Figure 7:
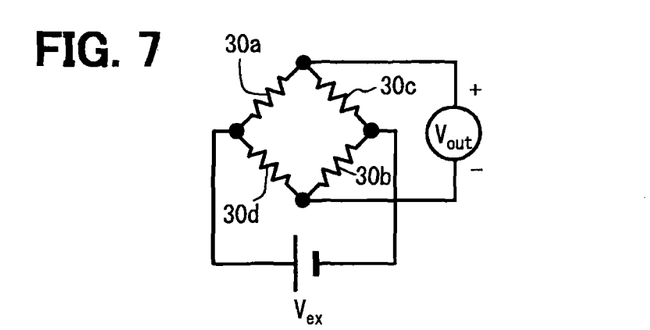
FIG. 7 is a circuit diagram of an equivalent circuit of the detection element of the straining body.

With reference to FIG. 7, an equivalent circuit of the elements 30a to 30d is represented as a bridge circuit, and, according to the change of the resistance value of each of the elements 30a to 30d, the bridge voltage Vout changes. Therefore, based on the bridge voltage Vout of each detector 30 disposed on the straining body 20, calculation of the moments $m_{z1}$, $m_{z2}$, and the forces $f_{z1}$, $f_{z2}$ are enabled.

When a force is applied along a surface direction, which is in parallel with the operation surface 14 (i.e., in a horizontal direction), all of the reaction forces at the installation positions of the elements 30a to 30d are either a pulling reaction force or a compressive reaction force. Therefore, no change is caused in the bridge voltage Vout. Thus, the detector 30 does not have sensitivity for such force along the horizontal direction.

The actuator 60 is used to cause a vibration in the housing 50, which is ultimately transferred to the driver's finger, when the driver operates the input apparatus 100. For example, when the driver presses (i.e., performs a press operation on) the operation surface 14, the actuator 60 causes a vibration of the housing 50 so as to provide the driver with a tactile sensation or a tactile feedback, causing the driver to feel like as if he/she has pressed a mechanical switch. In such manner, the operability of the input apparatus 100 is improved.

Further, the actuator 60 may also be used to convey a warning from the vehicle to the driver, through the vibration of the housing 50 caused by the actuator 60.

The signal processor 40 is implemented as a computer (i.e., hardware) that includes well-known parts such as CPU, ROM, RAM, and a signal processor such as an ND conversion circuit. The signal processor 40 realizes various functions of the input apparatus 100 by, for example, controlling the CPU to execute a program that is stored in the ROM. More practically, it calculates the moments $m_{z1}$, $m_{z2}$, and the forces $f_{z1}$, $f_{z2}$ based on a signal (i.e., the bridge voltage Vout) from the detector 30, and calculates the operation force and its position on the operation surface 14. Further, it outputs the calculated operation force and its position to the in-vehicle device as the operation information.

With reference to FIG. 4, the calculation principle of the operation position of the input apparatus 100 is identified is described, in which the operation force (Fz) is applied to a position of X mark, having coordinates of x1 and y1. The force Fz that is applied to the operation surface 14 in a perpendicular direction is a resultant force of a force $f_{z1}$ and a force $f_{z2}$ of equation 1. Further, equation 2 provides the balance of the moment about the Y-axis and equation 3 provides the balance of the moment about the X-axis regarding the operable body 10 at a time of application of the operation force. In equations 2 and 3, w is a total distance from the gravity center to respective tips of the arms 18.

When equations 1 to 3 are combined about the coordinates x1 and y1 (i.e., variables at this point), equations 4 and 5 are derived. By substituting the moments $m_{z1}$, $m_{z2}$ and the forces $f_{z1}$, $f_{z2}$ that are calculated by the signal processor 40, the coordinates x1 and y1 representing a position of the operation force on the operation surface 14 are calculated.

$$F_z = f_{z1} + f_{z2} \quad \text{(Equation 1)}$$

$$F_z \cdot x1 = f_{z1} \cdot \frac{w}{2} + m_{z2} \quad \text{(Equation 2)}$$

$$F_z \cdot y1 = m_{z1} - f_{z2} \cdot \frac{w}{2} \quad \text{(Equation 3)}$$

$$x1 = \frac{f_{z1} \cdot \frac{w}{2} + m_{z2}}{f_{z1} + f_{z2}} \quad \text{(Equation 4)}$$

$$y1 = \frac{m_{z1} - f_{z2} \cdot \frac{w}{2}}{f_{z1} + f_{z2}} \quad \text{(Equation 5)}$$

With continuing reference to FIG. 2, according to the input apparatus 100 in a plan view, the apparatus 100 has the closest-to-rim end of the operable body 10 extend towards the rim unit 240 from the broken line M that connects the straining bodies 20 closest to the rim 240 (i.e., straining bodies 20a, 20d). When the input apparatus 100 is installed on the core unit 220, the position of each of the straining bodies 20 is positioned farther from the rim unit 240 than the position of the operable body 10 is from the rim unit 240. Therefore, the operable body 10 is positioned as close as possible to the rim unit 240. As a result, the driver whose hand is gripping the rim unit 240 may easily extend his/her thumb to reach the operation surface 14.

When a positional relationship between the operable body 10 and each of the straining bodies 20 is simply defined such that the closest-to-rim end of the operable body 10 extends from the broken line M toward the rim unit 240, in a case where a part of the rim unit 240 closest to the operable body 10 has a radially-outward (i.e., radially-protruding) arc shape, such as in the present embodiment, the straining body 20 may interfere with the rim unit 240. As a result, it may be difficult to closely position the operable body 10 relative to the rim unit 240.

Therefore, in the present embodiment, the following two arrangements are devised. First, the two lines respectively connecting the gravity center 16 of the operation surface 14 and respective joint parts 22 of the straining bodies 20 closest to the rim unit 240 (e.g., straining bodies 20a, 20d) are configured to have the binding angle $\theta_0$ of less than 180 degrees, which is measured from the opening facing the rotation center of the steering wheel shaft 280 (i.e., the binding angle $\theta_0$ opens towards the steering wheel shaft 280).

Second, the straining body 20 positioned between the straining bodies 20 that are closest to the rim unit 240 is configured to be positioned on a side closer to the rotation center of the steering wheel shaft 280 relative to the straining bodies 20 closest to the rim unit 240. In other words, the straining bodies 20, other than the ones closest to the rim unit 240, are arranged between the straining bodies 20 closest to the rim unit 240 towards a steering wheel shaft side of the operable body 10. For example, the straining bodies 20b, 20c are positioned between the straining bodies 20a, 20d, on the side closer to the rotation center of the steering wheel shaft 280.

According to the above-described configuration, a greater portion of the operation surface 14 is reserved for extending towards the rim unit 240 in comparison to a configuration in which the straining bodies 20 are arranged to face each other with the operation surface 14 right in the middle in an interposing manner, where the operable body 10 has the same shape for both cases. Therefore, by having a greater portion of the operation surface 14 extend towards the rim unit 240, interference between the straining bodies 20 and the rim unit 240 is substantially prevented. Even when the rim unit 240 has an arc shape or a circle shape, the operable body 10 is positioned as close as possible to the rim unit 240 based on the devised arrangement described.

Further, in the present embodiment, the operable body 10 is supported by the housing 50 through the straining body 20 that is disposed along a periphery of the operation surface 14 of the operable body 10. The operable body 10 is tilted or is displaced relative to the housing 50 when the driver performs a press operation on the operation surface 14.

When the operation surface 14 of the operable body 10 is provided along an X-Y plane of the two-dimensional orthogonal coordinate system, the transfer surface 26a is displaced according to the rotation moments about the X-axis and the Y-axis, as well as, a force in a perpendicular direction to the operation surface 14. Therefore, the detector 30 detects a strain caused by the rotation moments about the X-axis and the Y-axis and the force in the perpendicular direction. Further, since the displacement of the transfer surface 26a changes according to the operation position on the operation surface 14, the detection result of the detector 30 reflects the rotation moments and the force in the perpendicular direction. The signal processor 40 then calculates the operation position based on the above detection result. In such manner, according to the present embodiment, the operation position on the operation surface 14 is accurately calculated.

If, for example, the position of the operation surface 14 is arranged at a higher position (i.e., raised in a height direction) with a leg part relative to a plane defined by the transfer surface 26a, a force factor in a direction in parallel with the operation surface 14, or a horizontal force factor, in the operation force on the operation surface 14 causes the tilt of the operation surface 14, the detection result of the detector 30 may possibly be influenced by the strain caused by such a horizontal force factor.

Such a horizontal force factor has nothing to do with the operation position of the operation force, and is unnecessary for the calculation of the operation position. That is, in case that the operation surface 14 is positioned at a raised height relative to a plane on which the transfer surface 26a is positioned, the calculation by the signal processor 40 may be more complicated for excluding the influence from such a horizontal force factor.

In the present embodiment, since the operation surface 14 and all of the transfer surfaces 26a are arranged in substantially in the same plane, the detection result of the detector 30 is prevented from including the horizontal force factor influence. Therefore, the calculation of the operation position by the signal processor 40 is simplified.

Further, the positional relationship between the operation surface 14 and the transfer surface 26a (i.e., the same plane arrangement), which may otherwise cause interference therebetween, will not result in such interference, due to the position of the straining body 20 in an "inside," or on a withdrawn side, relative to a rim-side end of the operable body 10 as shown in FIG. 2.

In the present embodiment, the transfer surface part 26 is an elastically-deformable member, in which an elastic deformation to curve the member is caused according to a perpendicular force factor of the operation force that is perpendicular to the operation surface 14. According to such configuration, the curving deformation of the elastically-deformable member (i.e., the transfer surface part 26) causes an elastic deformation in the inward direction of the transfer surface 26a. The detector 30 disposed on the transfer surface 26a of the transfer surface part 26 detects the amount of elastic deformation in the inward direction. Based upon the foregoing, the amount of elastic deformation detected by the detector 30 accurately reflects the force in the perpendicular direction perpendicular to the operation surface 14. Therefore, the signal processor 40 is enabled to calculate a force that is perpendicular to the operation surface 14 based on the amount of elastic deformation detected in the above-described manner.

In the present embodiment, each of the joint parts 22 of two straining bodies 20 is connected to a tip of one arm 18. When an operation force is applied to the operation surface 14, the operation force concentrates on the arm 18. Therefore, due to the arrangement of the straining body 20 on the tip of the arm 18, the force concentrated on the arm 18 is securely transferred to the transfer surface 26a of the straining body 20.

The joint parts 22 of two straining bodies 20, such as straining body 20a, 20b, may be combined into one body, and such a body of two joint parts 22 is connected to the tip of the arm 18. Therefore, due to the reduction of the number of the joint parts 22, the number of arms 18 formed on the operable body 10 is also reduced. Further, due to the reduction of the total number of the joint parts 22 of the straining bodies 20, the positioning of the operation surface 14 on the same plane as the transfer surface 26a is made easy, when the straining body 20 is connected to the operable body 10.

The first stopper 54 disposed on the bottom 52 of the housing 50 prevents damage to the operable body 10 even when, for example, an excessive operation force greater than a normal force is applied to the operation surface 14. Furthermore, having the second stopper 56 disposed on the bottom 52 of the housing 50, prevents damage to the transfer surface part 26 even when, for example, an excessive operation force greater than a normal force is applied to the operation surface 14.

Second Embodiment

Figure 9:
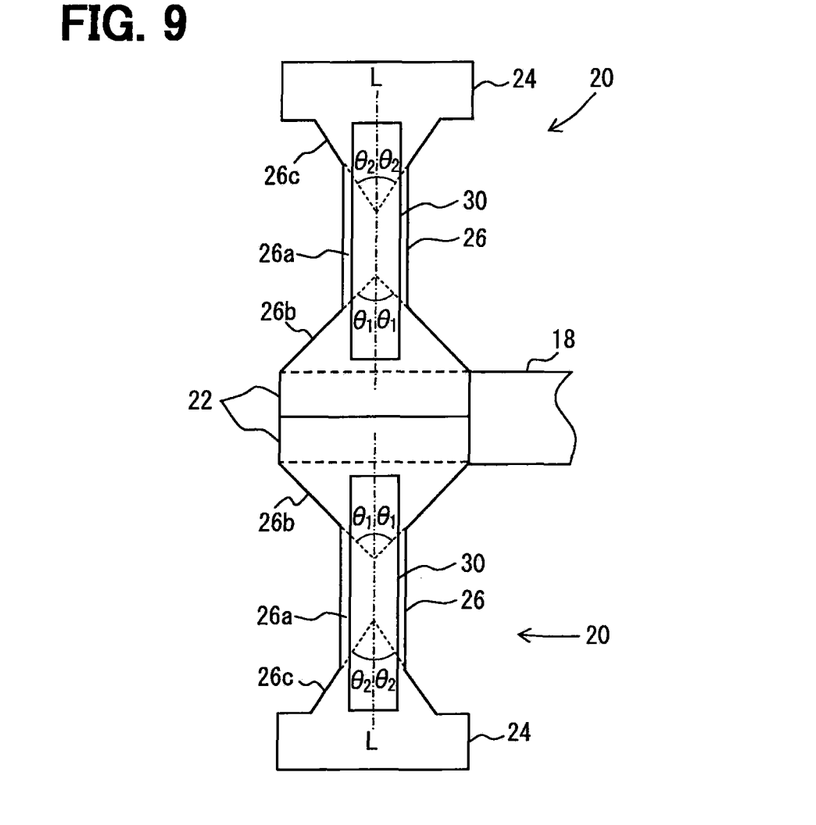
FIG. 9 is an illustration of the straining body in a second embodiment, where the transfer surface of the straining body has a tapered form.

The second embodiment is different from the first embodiment, in that the transfer surface part 26 of the straining body 20 has a different shape. With reference to FIG. 9, the transfer surface part 26 has a base taper portion 26b, having the width of the base taper portion 26b increase toward the joint part 22, and a tip taper portion 26c, having the width of the tip taper portion 26c increase toward the fixation part 24. The base taper portion 26b is formed along a portion of the transfer surface part 26 that is closest to the joint part 22. The tip taper portion 26c is formed along a portion of the transfer surface part 26 that is closest to the fixation part 24. By having a tapered structure, the end of the transfer surface part 26 closest to the joint part 22 and the end of the transfer surface part 26 closest to the fixation part 24 have an increased rigidity and strength, thereby increasing the durability of the straining body 20 and allowing a greater permissible amount for the operation force of the input apparatus 100.

Further, in the present embodiment, from among angles between the base taper portion 26b and an axial line L of the transfer surface part 26, an angle $\theta_1$ is defined to have a value between 30 degrees to 60 degrees (i.e., 30 a taper angle≤60). Further, from among angles between the tip taper portion 26c and the axial line L of the transfer surface part 26, an angle $\theta_2$ is defined to have a value between 30 degrees to 60 degrees (i.e., 30 a taper angle≤60). In such manner, the rigidity of both ends of the transfer surface part 26 is increased, as well as, an appropriate deformation is caused for the transfer surface part 26 according to the operation force on the transfer surface part 26. Therefore, such a structure enables an increased rigidity of the transfer surface part 26 as well as preventing the deterioration of the detection sensitivity of the transfer surface part 26.

Third Embodiment

Figure 10:
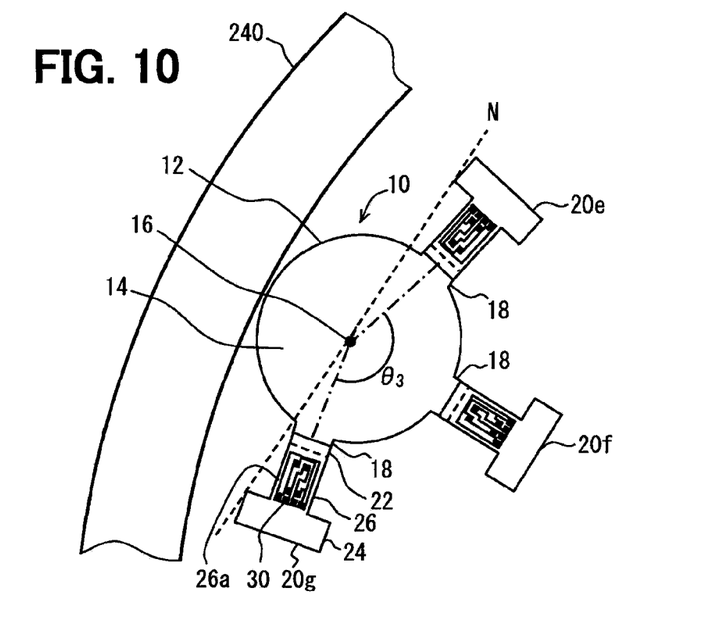
FIG. 10 is an illustration of the steering wheel having the input apparatus in a third embodiment, where the input apparatus has a different arrangement of the straining bodies in the third embodiment than the first embodiment.

With reference to FIG. 10, the third embodiment is different from the first embodiment in that it has a different arrangement of the straining body 20. In the third embodiment, the body part 12 has three arms 18 protruding therefrom. Each of the arms 18 has one straining body 20 connected thereto (i.e., straining body 20e, 20f, 20g). Even in such arrangement, a portion of the operable body 10 closest to the rim unit 240 (i.e., closest-to-rim end of the operable body 10) protrudes from a line connecting the end part of the straining bodies 20 that are closest to the rim unit 240. For example, the closest-to-rim end of the operable body 10 extends from a broken line N that connects the end parts of the straining body 20e, 20g.

Further, in the present embodiment, two dashed lines extend from the gravity center 16 of the operation surface 14 to respective joint parts 22 of the straining bodies 20 closest to the rim unit 240 (i.e., straining bodies 20e, 20g). A binding angle $\theta_3$, which is between the two dashed lines and opens towards the steering wheel shaft 280, is less than 180 degrees. Furthermore, the third straining body 20 (i.e., straining body 20f) is disposed in between the pair of straining bodies 20 that are closest to the rim unit 240 (i.e., straining bodies 20e and 20g) along the side of the operable body 10 that faces the steering wheel shaft 280 (i.e., away from the rim unit 240).

According to the above, even in the arrangement of three straining bodies 20, the same advantages as the first embodiment are achieved. Further, the transfer surface part 26 of the straining body 20 may have the same structure as the second embodiment.

The number of straining bodies 20 in the present embodiment is three, which is smaller than the first embodiment. However, when having at least three straining bodies 20, it is possible to detect the perpendicular force perpendicular to the operation surface 14 and the moments about the X-axis and the Y-axis, thereby enabling an accurate calculation of an operation position of the operation force.

Fourth Embodiment

Figure 11:
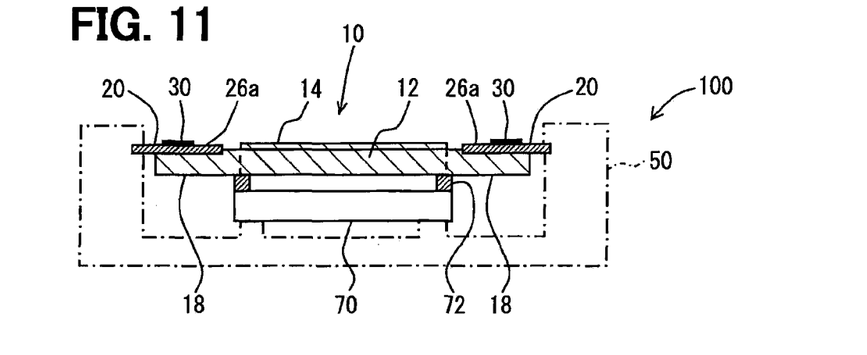
FIG. 11 is a cross-sectional view of the input apparatus in a fourth embodiment.

With reference to FIG. 11, in the fourth embodiment, a display unit 70 is disposed behind a back of the operable body 10. A seal member 72 is interposed between the display unit 70 and the operable body 10, and the operable body 10 is made from a light permeable material. The display unit 70 is configured to display an operation button image of a target in-vehicle device. The vehicle driver may operate the input apparatus 100 while watching a displayed button image. In such manner, the driver is enabled to intuitively operate the input apparatus 100, thereby having an improved operability.

Even in such an embodiment, the same advantages as the first embodiment are achieved when the same arrangement of the straining bodies as the first and/or third embodiment is employed.

Further, the same advantages as the second embodiment are achieved by employing the same straining body structure as the second embodiment.

Fifth Embodiment

Figure 12:
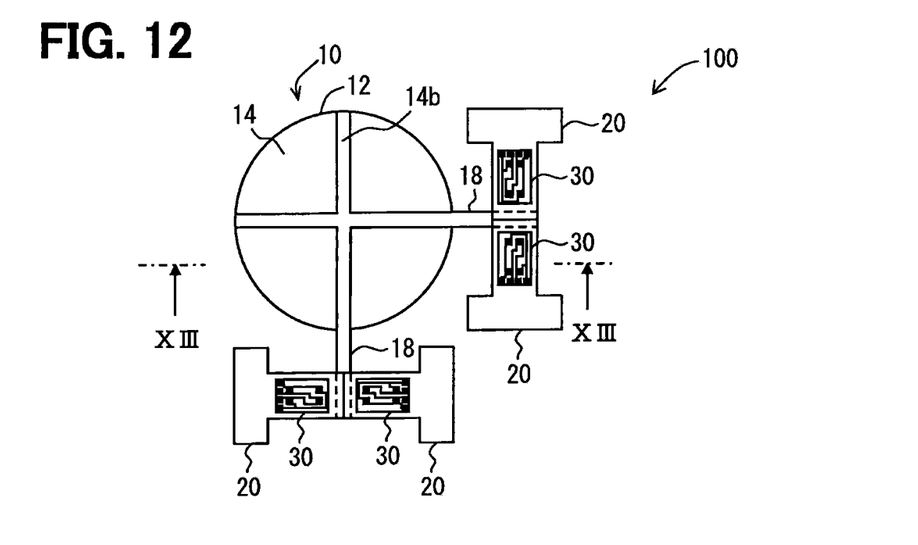
FIG. 12 is an illustration of an operable body of the input apparatus in a fifth embodiment, where the operation surface of the operable body is different from the operation surface of the first embodiment.
Figure 13:
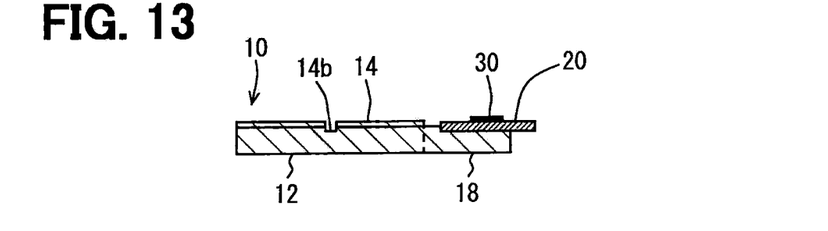
FIG. 13 is a cross-sectional view of the input apparatus of FIG. 12 along line XIII-XIII of FIG. 12.

With reference to FIGS. 12 and 13, the shape of the operation surface 14 is different in the fifth embodiment when compared to the first embodiment. The operation surface 14 of the fifth embodiment has a groove 14b. By having the groove 14b, the driver is enabled to recognize a rough operation position on the operation surface 14 just by touching the operation surface 14 and without having to view the operation surface 14. Even in such configuration, the fifth embodiment achieves the same advantages as the first embodiment by employing the same arrangement of the straining bodies as the first and/or third embodiment.

Further, the same advantages as the second embodiment are achieved by employing the same straining body structure as the second embodiment.

Sixth Embodiment

Figure 14:
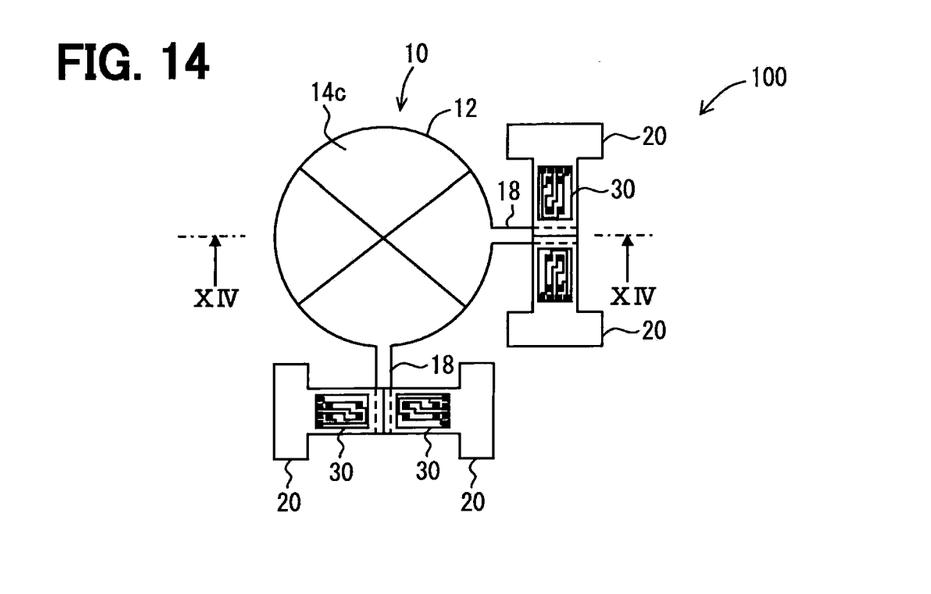
FIG. 14 is an illustration of the operable body of the input apparatus in a sixth embodiment, where the operation surface of the operable body is different from the operation surface of the first and fifth embodiments.
Figure 15:
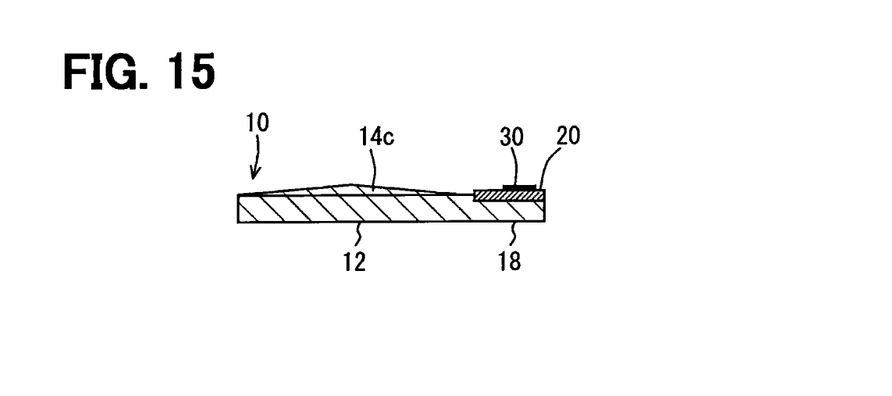
FIG. 15 is a cross-sectional view of the input apparatus of FIG. 14 along line XIV-XIV of FIG. 14.

With reference to FIGS. 14 and 15, in the sixth embodiment, a shape of an operation surface 14c is different from the one in the first embodiment. The operation surface 14c of the sixth embodiment is raised, or has a lift-up shape. By having such a lift-up shape for the operation surface 14c, the driver is enabled to recognize a rough operation position on the operation surface 14c just by touching the operation surface 14c and without having to view the operation surface 14c. Even in such configuration, the fifth embodiment achieves the same advantages as the first embodiment by employing the same arrangement of the straining bodies as the first and/or third embodiment.

Further, the same advantages as the second embodiment are achieved by employing the same straining body structure as the second embodiment.

Other Embodiments

Although the present disclosure has been fully described in connection with the first to sixth embodiments thereof with reference to the accompanying drawings, it is to be noted that various changes and modifications will become apparent to those skilled in the art.

For instance, though the rim unit 240 in the first embodiment is described as having a circular-ring shape, the rim unit 240 may have other shapes, such as a linear shape, an arc shape or the like, as long as the rim unit 240 is "grippable" by the vehicle driver. Even with such shapes of the rim unit 240, the same effects and advantages as the first to sixth embodiments are achieved.

Such changes, modifications, and summarized schemes are to be understood as being within the scope of the present disclosure as defined by appended claims.

What is claimed is:

1. A vehicular input apparatus disposed on a steering apparatus of a vehicle, the steering apparatus having a core unit and a rim unit, the core unit fixed on a steering shaft to rotate with the steering shaft and the rim unit disposed on a periphery of the core unit and gripped by a user, the vehicular input apparatus inputs operation information for operating an in-vehicle device installed in the vehicle, the vehicular input apparatus comprising:

a housing disposed on the core unit;

an operable body disposed on the housing and having an operation surface;

at least three straining bodies arranged on the housing and each having a joint part, a fixation part, and a transfer surface part, the joint part coupled to a periphery of the operable body, the fixation part affixed to the housing, and the transfer surface part being between the joint part and the fixation part and having a displacement transfer surface formed thereon for displacing the straining body according to a pressure caused by an operation force from the user, wherein two of the straining bodies positioned closest to the rim unit are designated as closest-to-rim straining bodies;

a strain gauge disposed on the displacement transfer surface of the straining body for detecting a strain of the displacement transfer surface caused by the displacement of the straining body; and an output unit calculating the operation force and an operation position of the operation force on the operation surface based on a detection result of each of the strain gauges, and outputting the operation position and the operation force calculated as the operation information to the in-vehicle device, wherein the operable body is positioned to have a rim end portion of the operable body extend beyond the closest-to-rim straining bodies towards the rim unit such that rim end portion of the operable body crosses an end point line defined between end points of the closest-to-rim straining bodies.

2. The vehicular input apparatus of claim 1, wherein the rim unit has a radially-outward arc shape at a portion close to the operable body, two lines extending from a gravity center of the operation surface to respective joint parts of the closest-to-rim straining bodies define a binding angle that opens towards the steering shaft and is less than 180 degrees, and the straining bodies other than the closest-to-rim straining bodies are arranged between the closest-to-rim straining bodies towards a steering shaft side of the operable body.

3. The vehicular input apparatus of claim 1, wherein the operation surface of the operable body has a plane defined by an X-axis and a Y-axis of a two-dimensional orthogonal coordinate system, the strain gauge detects a rotation moment about the X-axis, a rotation moment about the Y-axis, and the strain of the displacement transfer surface according to a perpendicular force in a direction perpendicular to the operation surface when the operation force is applied to the operation surface, and the output unit calculates the operation force and the operation position of the operation force based on the rotation moment about the X-axis, the rotation moment about the Y-axis, and the perpendicular force in the direction perpendicular to the operation surface that are detected by each of the strain gauges.

4. The vehicular input apparatus of claim 3, wherein the operation surface and all of the displacement transfer surfaces are positioned substantially on a same plane.

5. The vehicular input apparatus of claim 4, wherein the transfer surface part is an elastically-deformable member that is elastically deformable by the operation force applied to the operation surface, a perpendicular force factor of the operation force perpendicular to the operation surface causes an elastic deformation that curves the elastically-deformable member relative to the fixation part that is fixed on the housing, the strain gauge detects an amount of elastic deformation caused in the displacement transfer surface along an inward direction of the displacement transfer surface, and the output unit calculates the perpendicular force factor perpendicular to the operation surface based on the amount of elastic deformation detected by each of the strain gauges.

6. The vehicular input apparatus of claim 1, wherein the operable body has a body part that has the operation surface, and a plurality of operation surface connection units respectively protrude from a periphery of the body part, and at least one joint part of the straining body is connected to a tip of the operation surface connection unit.

7. The vehicular input apparatus of claim 6, wherein the joint parts of two straining bodies are combined into a single body and connected to the tip of the operation surface connection unit.

8. The vehicular input apparatus of claim 1, wherein the housing has a deformation regulation unit that faces a back side of the operable body relative to the operation surface, with a predetermined amount of gap reserved between the deformation regulation unit and the back side of the operable body.

9. The vehicular input apparatus of claim 1, wherein the housing has a deformation regulation unit that faces an opposite surface of the displacement transfer surface of the transfer surface part, with a predetermined amount of gap reserved between the deformation regulation unit and the opposite surface of the transfer surface part.

10. The vehicular input apparatus of claim 1, wherein the transfer surface part has a base taper portion formed along an end close to the joint part, with a width of the base taper portion increases towards the joint part, and the transfer surface part has a tip taper portion formed along an end close to the fixation part, with a width of the tip taper portion increases toward the fixation part.

11. The vehicular input apparatus of claim 10, wherein, a joint part side angle, from among angles between the base taper portion and a longitudinal axial line of the transfer surface part, has a value in a range of 30 to 60 degrees, and a fixation part side angle, from among angles between the tip taper portion and the longitudinal axial line of the transfer surface part, has a value in a range of 30 to 60 degrees.

* * * * *